United States Patent [19]

Domingo et al.

[11] Patent Number: 5,300,148
[45] Date of Patent: Apr. 5, 1994

[54] PIGMENTS, THEIR PRODUCTION AND USE

[75] Inventors: Manuel J. Domingo, Barcelona, Spain; Rolf Hasler, Riehen, Switzerland; Tibor Robinson, Basel, Switzerland; Viktor Sanahuja, Reinach, Switzerland

[73] Assignee: Sandoz Ltd., Basel, Switzerland

[21] Appl. No.: 869,681

[22] Filed: Apr. 16, 1992

[30] Foreign Application Priority Data

Apr. 17, 1991 [GB] United Kingdom ............... 9108135

[51] Int. Cl.$^5$ ............................................. C08K 5/45
[52] U.S. Cl. ................................. 106/498; 106/400; 106/401; 106/493; 106/494; 106/496; 106/497
[58] Field of Search ............... 106/400, 401, 493, 496, 106/497, 498, 499, 408, 410, 413

[56] References Cited

U.S. PATENT DOCUMENTS

| | | | |
|---|---|---|---|
| 4,012,192 | 3/1977 | Doerr ................................ | 8/650 |
| 4,418,014 | 11/1983 | Daniek ............................... | 8/652 |
| 4,731,093 | 3/1988 | Pfeiffer et al. ..................... | 8/576 |
| 5,066,309 | 11/1991 | Tempel et al. ..................... | 8/527 |

OTHER PUBLICATIONS

Chemiker-Ztg./(Chem. Apparatur/Verfahrenstechnik) 93 (1969) NR. 10, pp. 390-395.

*Primary Examiner*—Mark L. Bell
*Assistant Examiner*—Scott L. Hertzog
*Attorney, Agent, or Firm*—Robert S. Honor; Richard E. Vila; Thomas C. Doyle

[57] ABSTRACT

Pigments (P) obtainable by cationizing desolubilization of (L) the colored leuco form of sulphur dyes and standardization of the desolubilized products and their use, in particular in printing inks.

38 Claims, No Drawings

PIGMENTS, THEIR PRODUCTION AND USE

It has been found that a new category of pigments can be produced in a very economical way from sulphur dyes whose reduced form, i.e. leuco form, has its own colour, by transforming the soluble leuco form, by bonding it to a desolubilizing cation, into a less soluble form, which by standardization is transformed into a form usable as a pigment and which, surprisingly, is eminently suitable as a pigment.

The invention refers to this new kind of pigments, their production and use and compositions containing them.

The invention thus provides pigments (P) obtainable by cationizing desolubilization of (L) the coloured leuco form of sulphur dyes and standardization of the desolubilized products.

As sulphur dyes come in general into consideration conventional dyes known under this concept and as defined e.g. as "Sulphur Dyes" and "Sulphurized Vat Dyes" in VENKATARAMAN "The Chemistry of Synthetic Dyes" Vol. II (Chapters XXXV and XXXVI) (1952) and Vol. VII (1974) or as defined e.g. in the "Colour Index" as "Sulphur Dyes" and also as "Vat Dyes" with the further indication "sulphur", resp. with a structure number and a synthetic method involving a sulphurization. Essentially they are dyes that contain aromatically bound oligosulphide bridges that are reducible to thiol groups and may optionally be of oligomeric to polymeric structure. They are essentially free of solubilizing sulpho groups (also of thiosulphonic groups). By reduction with conventional reducing agents, e.g. with alkali metal sulphides (e.g. sodium or potassium sulphide or hydrosulphide) or/and reducing carbonyl compounds (e.g. with α-hydroxyacetone or aldo-sugars, in particular glucose, in the presence of alkali), the sulphur dyes may be transformed into the corresponding reduced i.e. leuco form that contains aromatically bound thiol groups which derive from the hydrogenation of the aromatically bound oligosulphide bridges. By this reductive treatment the insoluble sulphur dyes are transformed into soluble leuco sulphur dyes which are readily soluble in water in the form of their alkali metal salts.

As coloured leuco sulphur dyes (L) there may be employed commercially available leuco sulphur dyes having their own colour as well as coloured leuco sulphur dyes obtainable by reduction of commercially available optionally partially reduced sulphur dyes or also (preferably) coloured leuco sulphur dyes obtainable in or subsequently to the synthesis of the sulphur dyes in one operational sequence. As leuco sulphur dyes there are understood here such in which at least some of the oligosulphide bridges are reduced to thiol groups i.e. at least to such a degree until the corresponding leuco dye, at least in its sodium salt form, is hydrosoluble. Advantageously at least 25%, preferably at least 50%, in particular 50 to 100%, of the total of the present oligosulphide bridges are reduced to thiol groups (in particular e.g. as thiolic acid or sodium thiolate groups). The leuco sulphur dyes (L) are considered here as hydrosoluble if they give at a concentration of 50 g/l in distilled water at room temperature ($=20°$ C.) a true or colloidal solution.

As coloured leuco form there is understood here such a form that displays a colour in the visible range of the light-spectrum (400–700 nm), particularly also a mixed colour (e.g. brown, gray or black).

As (L) there may be employed any leuco sulphur dye; the following is a list of leuco sulphur dyes [Colour Index Leuco Sulphur denomination or Colour Index reduced Vat (sulphur) denomination] that may advantageously be employed:

C.I. Leuco Sulphur Black 1, CAS: 66241-11-0
C.I. Leuco Sulphur Black 2, CAS: 101357-26-0
C.I. Leuco Sulphur Black 11, CAS: 90480-94-7
C.I. Leuco Sulphur Black 18, CAS: 90170-71-1
C.I. Leuco Sulphur Red 10, CAS: 1326-96-1
C.I. Leuco Sulphur Red 14, CAS: 68585-53-5
C.I. Leuco Sulphur Blue 3, CAS: 85566-77-4
C.I. Leuco Sulphur Blue 7, CAS: 69900-21-6
C.I. Leuco Sulphur Blue 11, CAS: 90480-94-7
C.I. Leuco Sulphur Blue 13, CAS: 12262-26-9
C.I. Leuco Sulphur Blue 15, CAS: 100208-97-7
C.I. Leuco Sulphur Blue 20, CAS: 85940-25-6
C.I. Reduced Vat Blue 43, CAS: 1327-79-3
C.I. Leuco Sulphur Green 2, CAS: 12262-32-7
C.I. Leuco Sulphur Green 16, CAS: 70892-38-5
C.I. Leuco Sulphur Green 35, CAS: 90170-23-3
C.I. Leuco Sulphur Green 36, CAS: 90295-17-3
C.I. Leuco Sulphur Brown 1, CAS: 1326-37-0
C.I. Leuco Sulphur Brown 3, CAS: 100208-66-0
C.I. Leuco Sulphur Brown 10, CAS: 12262-27-0
C.I. Leuco Sulphur Brown 21, CAS: 97467-78-2
C.I. Leuco Sulphur Brown 26, CAS: 71838-68-1
C.I. Leuco Sulphur Brown 31, CAS: 1327-11-3
C.I. Leuco Sulphur Brown 37, CAS: 70892-34-1
C.I. Leuco Sulphur Brown 52, CAS: 68511-02-4
C.I. Leuco Sulphur Brown 95, CAS: 90268-97-6
C.I. Leuco Sulphur Brown 96, CAS: 85736-99-8
C.I. Leuco Sulphur Orange 1, CAS: 1326-49-4
C.I. Leuco Sulphur Yellow 9, CAS: 85737-01-5
C.I. Leuco Sulphur Yellow 22, CAS: 90268-98-7

According to the invention leuco sulphur dyes (L) having their own colour are desolubilized by bonding to cations that lower the solubility of the leuco sulphur dye, whereby it is assumed that the sterical structure of the coloured leuco sulphur dye (L) is essentially maintained and that the thiolate anions are bound to the desolubilizing cations.

The exact structure of sulphur dyes and of their reduced i.e. leuco form is mostly unknown or not completely known even if the starting compounds are known, since e.g. the number and/or the position of the oligosulphide bridges, the number of sulphur atoms in one oligosulphide bridge, the number of heterorings and/or NH-bridges and/or the number of repeating monomeric units in the sulphur dye molecule may vary depending on the starting materials and synthetic conditions.

For instance the leuco sulphur dye C.I. Leuco Sulphur Black 1 which may be represented e.g. by the following presumable formula

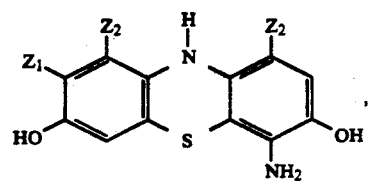

(I)

wherein $Z_1$ signifies an amino group —$NH_2$ or, together with the —$Z_1$ of a further structure of formula (I), a bridge —NH— and, at least one of the two symbols $Z_2$ signifies -SNa and the other, if it does not signify -SNa, signifies either hydrogen or together with a —$Z_2$ of a further structure of formula (I) an oligosulphide bridge —$(S)_p$— in which p represents the number of sulphur atoms in the oligosulphide bridge, p signifying preferably 2 to 10 and the substituent $Z_2$ not vicinal to $Z_1$ preferably signifying -SNa, may be produced e.g. by reduction of C.I. Sulphur Black 1 with a suitable reducing agent e.g. sodium (hydro)sulphide or more directly by reaction of sodium 2,4-dinitrophenolate with a mixture of sodium sulphide and sulphur in aqueous medium advantageously at 110°-150° C. (duration of the reaction preferably 6-15 hours). C.I. Leuco Sulphur Black 2 may be obtained in an analogous way as C.I. Leuco Sulphur Black 1 using however, picric acid together with the sodium 2,4-dinitrophenolate.

C.I. Leuco Sulphur Brown 37 may e.g. be obtained by reduction of C.I. Sulphur Brown 37 with a suitable reducing agent e.g. sodium (hydro)sulphide or more directly in the following way: m-phenylenediamine is reacted first with formaldehyde and then with a mixture of water, diethyleneglycol monoethylether, sodium sulphide and sulphur advantageously at 140°-170° C., preferably during 30 to 50 hours.

C.I. Leuco Sulphur Orange 1 may e.g. be obtained by reduction of C.I. Sulphur Orange 1 with a suitable reducing agent e.g. sodium (hydro)sulphide or more directly by reaction of 2,4-diaminotoluene with sulphur in the melt, advantageously at 190°-250° C. during preferably 20-30 hours, then dissolving the product with aqueous sodium hydroxide at the boil, oxidizing the sulphur in excess with air and then adding a small quantity of glucose to obtain a liquid reduced mass.

In an analogous or similar way there may be obtained further leuco sulphur dyes, in particular such of the above list, from the corresponding starting materials. The produced leuco sulphur dyes may then be desolubilized, advantageously in the same process sequence.

As cationizing desolubilization-for the purpose of the invention-there is meant the introduction of one or more desolubilizing cations into the molecule essentially by binding to the thiolate anion, as obtainable by reaction of (L) with a suitable cationic or cation-yielding agent and in particular as described in more detail below.

As desolubilization there is meant the reduction of the solubility in water, obtained by the above cationization. By the cationizing desolubilization of the invention the solubility in organic solvents may also be substantially reduced.

The products (P) of the invention are designated as pigments, as they are defined e.g. in the "Colour Index" under the heading "Pigments" or in VENKATARAMAN "The Chemistry of Synthetic Dyes" Vol. V (1971).

The process for the production of the pigments (P) is characterized by the reaction of a coloured leuco sulphur dye (L) with at least one cationizing compound (A), which is a compound suitable for the introduction of at least one desolubilizing cation, and by the standardization of the desolubilized product.

Preferably (L) is at least partially in sodium thiolate form.

The reaction of (L) with (A) takes place advantageously in aqueous or aqueous/organic medium.

The cations present in (A) (e.g. metal cations in metal compounds or mono- or polyammonium cations in ammonium compounds) or/and obtainable by protonation of (A) in particular if (A) is a mono- or polyamine (i.e. mono- or polyammonium cations) are indicated in the following as "A-cations". As desolubilizing cations (A-cations) come into consideration polyvalent metal cations and substituted ammonium cations.

As polyvalent metal cations come into consideration mainly cations of light metals [preferably alkaline earth metal cations, in particular magnesium, calcium, strontium and barium, earth metal cations, in particular aluminium, and titanium (also titanyl)] and transition metal cations (in particular chromium, manganese, iron, cobalt, nickel and copper), advantageously also in combination with substituted ammonium cations in particular as corresponding to the compounds ($A_2$) and/or ($A_3$) mentioned below. Of the above metal cations the alkaline earth metal cations (in particular magnesium and before all calcium) are preferred.

The polyvalent metal cations are advantageously employed in the form of
($A_1$) a polyvalent metal base or a polyvalent metal salt, As metal bases ($A_1$) there are essentially meant hydroxides, oxides and basic salts (in particular hydroxychloride and hydroxycarbonates) and as salts ($A_1$) there are essentially meant hydrosoluble salts preferably of strong mineral acids (in particular sulphates, phosphates or preferably chlorides) or of low molecular aliphatic carboxylic acids (in particular of simple carboxylic acids with 1 to 4 carbon atoms, preferably formates, acetates and propionates), so long as the corresponding metal salts are hydrosoluble. Preferably ($A_1$) is chosen among the following compounds:

($A_{11}$) hydroxides, oxides or (optionally basic) salts of polyvalent light metals, and, ($A_{12}$) polyvalent transition metal oxides, hydroxides or (optionally basic) salts.

Preferred compounds ($A_{11}$) are MgO, $MgCl_2$, Ca(OH)$_2$, $AlCl_3$ and $TiOCl_2$, of which Ca(OH)$_2$ is most preferred.

Preferred compounds ($A_{12}$) are copper-II oxide or chloride, manganese dichloride, nickel oxide and iron sulphate or trichloride, of which iron trichloride is preferred.

Among ($A_{11}$) and ($A_{12}$) the compounds ($A_{11}$) are preferred.

For the reaction of the leuco dyes (L) with ($A_1$) the free thiol form or the alkali metal salt form, in particular the sodium thiolate form, may be reacted with corresponding hydroxides or oxides or (basic) salts; the metal salts are preferably reacted with the sodium thiolate form (L) so that the salt of the leuco sulphur dye thiolate anion with the desolubilizing cation formed by ion exchange reaction precipitates while the hydrosoluble sodium salt of the anion of the employed metal salt ($A_1$) remains in solution.

Substituted ammonium cations are advantageously introduced by employing
($A_2$) optionally protonated and/or quaternized polyamines, or
($A_3$) tertiary or quaternized amines containing at least one fatty radical with at least 10 carbon atoms.

As ($A_2$) and ($A_3$) there may in general be employed known compounds.

Compounds ($A_2$) are advantageously at least colloidally hydrosoluble polycationic polymers that contain basic amino and/or imino groups and/or an acid addition product and/or a quaternary derivative thereof.

The compounds ($A_2$) are here defined as at least colloidally soluble in water if they give true or colloidal solutions at a concentration of 3 g/l in distilled water at 20° C. That they are polycationic means that they contain several basic amino groups (primary, secondary or tertiary amino groups) and/or ammonium groups (quaternary ammonium groups and/or protonated amino groups). The polymers ($A_2$) are principally such with a high cationic charge density (in particular in protonated and/or quaternized form) and are preferably aliphatic. Preferably ($A_2$) are aliphatic polycationic polymers in which at least 20%, advantageously at least 40%, of the heteroatoms are nitrogen atoms (the remaining, if present, being preferably oxygen atoms).

Preferably ($A_2$) is chosen among the following polymers:

($A_{21}$) reaction products of
- ($x_1$) cyanamide, dicyanodiamide, guanidine or biguanide with
- ($x_2$) at least one primary or secondary mono- or polyfunctional aliphatic mono- respectively polyamine;

($A_{22}$) mixtures or pre-reacted products of ($A_{21}$) with
- ($x_3$) at least one N-methylol compound of ureas, melamine, guanamines, triazinones, urones, urethanes, carbamates or acid amides optionally in the presence of a catalyst (k);

($A_{23}$) precondensates of ($A_{21}$) with
- ($x_4$) epihalohydrin or dihalohydrin;

($A_{24}$) reaction products of ammonia or ($x_2$) with ($x_4$);

($A_{25}$) reaction products of ($A_{24}$) with
- ($x_5$) 1,3-diaminopropanol-2;

($A_{26}$) homopolymers of
- ($x_6$) a mono- or di(meth)allylamine
or co- or terpolymers of
- ($x_7$) one or more mono- and/or di(meth)allylamine and optionally tri(meth)allylamine;

($A_{27}$) polymers, containing as repeating units at least two quaternary ammonium groups linked by aliphatic and/or aromatic hydrocarbon bridges which may optionally be interrupted by ether-oxygen and/or ester, amide and/or imide groups;

or mixtures of at least 2 of the polymers ($A_{21}$) to ($A_{27}$).

Polymers of the kind ($A_{21}$), ($A_{22}$), ($A_{23}$), ($A_{24}$), ($A_{25}$), ($A_{26}$) and ($A_{27}$), and mixtures thereof, are described e.g. in the published patent applications DE 32 16 913 A1 (=U.S. Pat. Nos. 4,439,203 and 4,511,707), DE 32 17 835 A1 (=U.S. Pat. No. 4,436,524), DE 33 30 120 A1 (=U.S. Pat. No. 4,475,918), DE 34 22 822 A1 (=U.S. Pat. No. 4,559,058), DE 34 46 282 A1 (=U.S. Pat. No. 4,718,918), DE 34 46 284 A1 (=U.S. Pat. No. 4,645,511), DE 35 25 104 A1 (=GB 2 163 760 A and U.S. Pat. No. 4,764,585), DE 36 22 840 A1, EP 151 370 A2, EP 280 655 A (=DE 37 06 176 A1 =U.S. Pat. No. 4,838,896) and WO 81/02423 (=U.S. Pat. No. 4,410,652). The content of these publications is incorporated herein by reference.

As ($x_2$) come into consideration advantageously ($C_{1-4}$-alkyl)amines, alkylenediamines and polyalkylenpolyamines with 2 to 6 carbon atoms in the alkylene bridge and which may optionally be substituted at the nitrogen atoms by $C_{1-4}$-alkyl, the molecule containing at least one, preferably at least two, reactive nitrogen-bound hydrogen atoms. As $C_{1-4}$-alkyl come into consideration all possible alkyl radicals with 1 to 4 carbon atoms, namely methyl, ethyl, n-propyl, isopropyl, n-butyl, sec-butyl, isobutyl and t.butyl, among which the lower molecular groups are preferred, particularly ethyl and methyl. As ($x_2$) there are preferably employed compounds of formula

  (II)

in which m signifies a number from 2 to 6 and n signifies a number from 1 to 3, $m \times n$=preferably 2 to 6, more preferably 4 to 6.

If n signifies 2 or 3 the alkylene bridges may be the same or different.

The following amines may in particular be named: ethylenediamine, propylenediamine, tetramethylenediamine, hexamethylenediamine, diethylenetriamine, triethylenetetramine and ethylenepropylenetriamine. As compound of formula (II) there is preferably employed diethylenetriamine.

As compound ($x_1$) there is employed preferably dicyanodiamide.

The reaction of ($x_1$) with ($x_2$) takes place advantageously in the absence of water or of any other solvent, preferably at temperatures above 50° C., principally in the temperature range of 60° to 200° C., in particular 80° to 180° C. For the reaction of ($x_1$) with ($x_2$) the components ($x_1$) and ($x_2$) are employed advantageously in a molar ratio in the range of 0.75/1.25 to 1.25/0.75, preferably in the range of 1.1/0.9 to 0.9/1.1, in particular 1/1. The reaction action of ($x_1$) with ($x_2$) takes place with development of ammonia and is advantageously continued until the ammonia development decreases, in particular until 1.2 to 2, advantageously 1.4 to 1.9, preferably 1.6 to 1.9 moles of ammonia per mole of employed compound ($x_1$) are split off. In general it is recommended to terminate the reaction before the product gels, respectively at the beginning of gelling, e.g. by addition of water (preferably ice water or ice) and/or by decreasing the temperature of the reaction mixture. It is of particular advantage to carry out the reaction in the presence of a catalyst (k) which advantageously is a metal salt of a metal of the second or third, preferably of the second group of the periodic system of elements, in particular an aluminum, magnesium or preferably zinc salt of a mineral acid, with particular preference zinc chloride. The catalyst is advantageously mixed with ($x_1$) and ($x_2$) at the beginning or is mixed with a melt of ($x_2$) and to this melt ($x_1$) may then be added or the catalyst (k) may e.g. be added at a temperature in the range of 80° to 130° C. to a mixture of ($x_1$) and ($x_2$). The obtained condensation product may be employed so as it has been produced or may advantageously be treated with an acid, in particular with an inorganic acid (preferably hydrochloric acid, sulphuric acid or phosphoric acid) advantageously to reach a pH in the range of 2 to 6, preferably 3 to 5, in particular 3 to 4.5. The pH value is referred to a 10% aqueous dilution of the condensation product of ($x_1$) and ($x_2$) as a standard; the protonated product may however also be in a more concentrated or more diluted form e.g. as a 50% composition or even be dried to a dry composition. The catalyst (k) is advantageously used in an amount of 0.01 to 10% by weight, preferably 0.1 to 5% by weight, in particular 0.2 to 1% by weight referred to the sum of ($x_1$) and ($x_2$). Instead of phosphoric acid there may be employed for protonation also phosphoric acid partial esters, in particular phosphoric acid mono- or di-($C_{1-12}$-alkyl) or -phenyl esters and/or acidic ammonium salts of the phosphoric acid or phosphoric acid monoesters, or also $C_{1-12}$-alkyl- or phenyl-phosphonic acids or a monoammonium salt thereof or a mono-$C_{1-12}$-alkyl- or -phenyl-ester thereof; preferably there is employed unsubstituted phosphoric acid.

For the production of the products ($A_{22}$) and ($A_{23}$) the described products ($A_{21}$) are blended or reacted with the respective components ($x_3$) or ($x_4$).

As ($x_3$) come into consideration conventional N-methylol compounds as they are known for instance as crosslinkers for cellulosic fibers and in which the methylol groups may optionally be etherified with $C_{1-4}$-alkyl, e.g. N-methylol derivatives of urea or of cyclic ureas (e.g. of ethylene urea, propylene urea, acetylene diurea, dihydroxy ethylene urea, dimethyl propylene urea, hydroxy- or methoxy-5,5-dimethylpropylene urea), urone or alkyl-hexahydro-1,3,5-triazine-2-one, wherein alkyl contains 1-12 carbon atoms, methylolated lactames of $C_{4-6}$-aminocarboxylic acids, N,N-dimethylol(meth)acrylamide, N-methylol(meth)acrylamide, β,N-dimethylol(meth)acrylamide, N-methylol-cyclic carbamates with 2 to 4 carbon atoms in the alkylene ring element, $C_{1-4}$-alkylene-N,N,N',N'-tetramethyloldicarbamates, $C_{1-4}$-alkyl-N,N'-dimethylolcarbamates, wherein the alkyl radical is substituted with hydroxy or $C_{1-2}$-alkoxy, and N-methylolated derivatives of aminosubstituted triazines, in particular melamine bearing 1 to 6, advantageously 2 to 6, in particular 3 to 6 methylol groups at the three amino groups, or guanamines in which the two amino groups bear advantageouly 2 to 4 methylol groups and the 4-position substituent is $C_{1-12}$-alkyl or $C_{6-12}$-aryl. The methylol groups may optionally be etherified e.g. with $C_{1-4}$-alkyl, preferably methyl. Among the above mentioned methylol derivatives the urea derivatives and the melamine derivatives are mainly preferred, in particular N,N'-dimethylolethylene-or -propyleneurea, N,N'-dimethylol-4,5-dihydroxyethyleneurea and N,N'-dimethylolurea, and tri- to hexamethylolmelamine, in particular hexamethylolmelamine. ($A_{21}$) is advantageously mixed with ($x_3$) in the presence of a catalyst. If ($A_{21}$) already contained a catalyst (k) a further addition of a catalyst may be superfluous; if ($A_{21}$) contained no catalyst or an insufficient amount of catalyst it is preferred to add a catalyst as conventional for the crosslinking of methylol compounds, in particular a compound of a metal of the second or third group as mentioned above for (k), for instance a magnesium, zinc or aluminum salt of an inorganic acid (e.g. nitrate, chloride, sulphate or phosphate), optionally in the presence of an alkali metal salt e.g. sodium sulphate. The reaction takes place advantageously at temperatures in the range of 20° to 80° C., preferably 60° to 75° C., in aqueous medium and is preferably terminated before the product gels. Per part by weight of ($A_{21}$) there are employed advantageously 0.625 to 20 parts by weight of ($x_3$) and 0.025 to 6 parts by weight of (k), preferably 1.75 to 7.5 parts by weight of ($x_3$) and 0.25 to 1.25 parts by weight of (k). Suitable and in particular also preferred reaction conditions, quantity ratios and compounds are described in particular in the PCT publication WO 81/02423 which is incorporated herein by reference.

As ($X_4$) come essentially into consideration epichlorhydrin and epibromohydrin and further dichlorohydrin and dibromohydrin, in particular epichlorohydrin. The reaction of ($X_4$) with ($A_{21}$) may be carried out in a manner known per se, in particular as described in DE-A 32 16 913 or in DE-A 35 25 104 both of which are incorporated herein by reference, in particular with reference to the possible and preferred reaction conditions and quantity ratios ratios of the reactants and to the production examples.

The reaction of ammonia or ($x_2$) with ($x_4$) may also be carried out in a manner known per se, in particular as described in DE-A 34 46 282 or in DE-A 34 46 284 both of which are incorporated herein by reference.

Compounds ($A_{22}$) may be produced in an analogous way.

Products ($A_{26}$) may be also produced in a manner known per se, in particular as described in European published patent application EP 280 655 A, which is incorporated herein by reference, in particular with reference to possible and preferred reactants, reaction conditions and quantity ratios as well as to the production examples.

Products ($A_{26}$) may also be produced in known manner, in particular as described in DE 32 17 835 A1 which in incorporated herein by reference, especially with reference to the usable and preferred reactants, the possible and preferred reaction conditions and quantity ratios and in particular to the production examples.

The compounds ($A_3$) are suitably at least colloidally soluble in water [analogously to the compounds ($A_2$)]. As compounds ($A_3$) there may be employed in general known compounds, in particular such as described in DE-AS 16 95 787 (=U.S. Pat. No. 3,466,278) and in DE 35 34 102 A1 (=GB 2 165 268 A), both of which are incorporated herein by reference. As ($A_3$) the following compounds come preferably into consideration:

($A_{31}$) tertiary fatty amines of the formula

wherein
R signifies an aliphatic hydrocarbon radical (a fatty radical) with 10-24 carbon atoms,
$R_1$ signifies $C_{1-4}$-alkyl, and,
$R_2$ signifies $C_{1-24}$-alkyl, $C_{3-24}$-alkenyl or benzyl and protonated acid addition products thereof, and quaternary fatty ammonium compounds of the formula

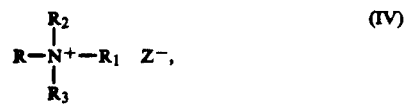

wherein
$R_3$ signifies $C_{1-4}$-alkyl, and
$Z^-$ signifies the equivalent of an anion.

($A_{32}$) methylolated melamine derivatives containing at least one $C_{10-24}$-fatty radical and at least one quaternary ammonium group.

The tertiary amines of formula (III) may be produced in an manner known per se, e.g. by introduction of the radicals $R_1$ and $R_2$ into corresponding fatty amines R-$NH_2$. Suitable fatty amines R-$NH_2$ are, e.g. lauryl amine, palmityl amine, myristyl amine, oleyl amine, stearyl amine, isotearyl amine, behenyl amine and arachidyl amine and technical mixtures of such fatty amines, e.g. coconut fatty amine, tallow fatty amine or technical oleyl amine. The radicals $R_1$ and $R_2$ may be introduced by conventional alkylation reactions, e.g. by reaction with corresponding halides under dehydrohalogenating conditions. If $R_2$ is a higher fatty radical, e.g. as listed above for R, also the corresponding di-fatty amines of formula $R-NH-R_2$ may e.g. be alkylated with an $R_1$-yielding compound. For protonation of compounds of formula (III) there may be used conventional acids, in particular conventional mineral acids (e.g. hydrochloric acid, sulphuric acid, phosphoric acid) or also aliphatic preferably low molecular carboxylic acids, e.g. simple aliphatic carboxylic acid with 1 to 4 carbon atoms (e.g. formic acid, acetic acid or propionic acid), hydrocarboxylic acids with 2 to 4 carbon atoms (e.g. glycollic acid, lactic acid, tartaric acid and citric acid) and aliphatic dicarboxylic acids with 2 to 6 carbon atoms (e.g. oxalic acid, malonic acid, succinic acid, fumaric acid or adipic acid).

The compounds of formula (IV) may be produced by quaternization of compounds of formula (III) employing $R_3$-yielding quaternization agents, in particular alkyl halides or alkyl sulphates, mainly the corresponding alkyl chlorides or bromides or methyl of ethyl sulphates. $Z^-$ is advantageously a counterion as is formed during quaternization, e.g. chloride, bromide, methosulphate or ethosulphate.

$R_1$ and $R_3$ preferably signify ethyl or, in particular, methyl. $R_2$ preferably signifies methyl, ethyl or benzyl.

Preferred compounds ($A_{32}$) may be represented by the following general average formula

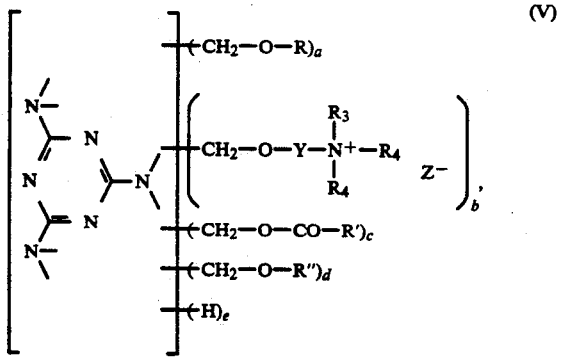

(V)

in which
R' signifies an aliphatic hydrocarbon radical with 1-23 carbon atoms,
R" signifies hydrogen or $C_{1-4}$-alkyl,
$R_4$ signifies $C_{1-4}$-alkyl or $C_{2-4}$-hydroxyalkyl,
Y signifies $C_{2-4}$-alkylene or di(hydroxymethyl)-ethylene,
$Z^-$ signifies the equivalent of an anion,
a is a number from 0.5 to 2.5,
b is a number from 1 to 1.2,
c is a number from 0 to 2.5,
d is a number from 1 to 4.5
e is 6-(a+b+c+d), and
a+b+c+d=3 to 6.

Methylolmelamine compounds of the kind of formula (V) are, in general, known and described e.g. in German patent publication DE AS 16 95 787, the content of which is incorporated herein by reference.

R'-CO- is the radical of a conventional aliphatic carboxylic acid and is advantageously either the acyl radical of a fatty acid with 12 to 24 carbon atoms or preferably of a low molecular acid, in particular with 1 to 4 carbon atoms and signifies preferably propionyl or, in particular, acetyl. R" preferably signifies methyl. Y preferably signifies $C_{2-4}$-alkylene and $R_4$ preferably signifies $C_{2-4}$-hydroxyalkyl or methyl or ethyl; the quaternary radical derives, in particular, from the reaction of the corresponding methylol group, or of its methylether, with a mono-, di- or trialkanolamine (preferably mono-, di- or triethanolamine or mono-, di- or triisopropanolamine) which is preferably employed in the form protonated with R'—COOH, and subsequent alkylation, if required, for the introduction of radicals $R_4$ respectively quaternization for the introduction of the radical $R_3$.

The molecule of formula (V) contains advantageously at least one radical R. Preferably a signifies 1.5 to 2.2; c preferably signifies 0 to 1.5, in particular 1 to 1.2; e preferably signifies 0.

Preferred compounds of formula (V) correspond to the following general average formula

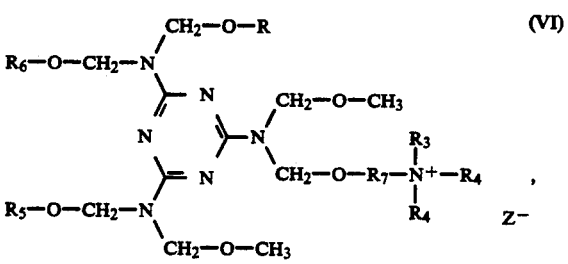

(VI)

in which
$R_5$ signifies R, R" or R'—CO—,
$R_6$ signifies R" or R'—CO— and,
$R_7$ signifies $C_{2-4}$-alkylene.

Analogously as described above for ($A_1$), for the reaction of non-protonated and non-quaternized compounds ($A_2$) and/or ($A_3$) there may be employed leuco sulphur dyes (L) in sodium thiolate form or in the non-neutralized thiolic acid form and in general in the non-oxidized thiol form, whereas for the reaction of protonated and/or quaternized compounds ($A_2$) respectively ($A_3$) there is employed preferably the sodium salt form of (L).

For the desolubilization of the invention there may be employed compounds ($A_1$) or compounds ($A_2$) and/or ($A_3$) or also advantageously mixtures of compounds ($A_1$) and compounds ($A_2$) and/or ($A_3$), or more than one of the above desolubilization steps with ($A_1$) and with ($A_2$) or/and ($A_3$) may be carried out sequentially [preferred ($A_2$) or/and ($A_3$) is reacted first and ($A_1$) is reacted afterwards], so that corresponding thiolate mixed salts of polyvalent metal cations and mono- or polyammonium cations from ($A_2$) respectively ($A_3$) are formed. If ($A_1$) and ($A_2$) and/or ($A_3$) are used their relative weight may be in any desired range, suitably such that an efficient amount of each, e.g. at least 5% by weight, is employed; the relative weight of ($A_1$) to the other cationizing compounds [i.e. ($A_2$) and/or ($A_3$)] preferably is in the range of 5/95 to 95/5; upon reaction of ($A_2$) and/or ($A_3$) ($A_1$) is preferably used in excess over the amount stoichiometrically required for the residual cationization of (L), in order to bind other anions that might be present (if present), e.g. sulphide, sulphite or sulphate.

The products obtainable according to the invention by reaction of (L) with (A) may be represented by means of the following schematic formula $$L_1(\!-\!S\!-\!A')_y \quad \quad (VII)$$

wherein
- $L_1$ signifies the thiol-bound radical of (L),
- y signifies the thiol-functionality of (L) [i.e. the average number of -SH respectively $-S^-$ per molecule (L)], and,
- A' signifies the linked portion of the cation of (A), i.e. (A-cation)/w, w signifying a number from 1 to the functionality of the A-cation.

The thiolate anions of (L) may be represented by the following formula $$L_1(\!-\!S^-)_y \quad \quad (VIII)$$

According to a feature of the invention it is possible to react only a part of the thiol respectively thiolate groups present in (L) with (A) (e.g. between 30 and 100%, in particular 60 to 95%) and the thiol or thiolate groups in excess may then be oxidized; it is however preferred to react exhaustively the present thiol and/or thiolate groups with (A).

Per val of (L) there may be employed e.g. 0.5 to 10, preferably 1 to 3 vals of $(A_1)$.

Per val of (L) there may e.g. be employed 0.2 to 10 vals of $(A_2)$ and/or $(A_3)$, preferably 0.5 to 3 vals of $(A_2)$ and/or $(A_3)$.

Advantageously there is employed in total at least one val of the total of the compounds (A) per val of (L).

For an exhaustive salt formation there may be employed an excess of (A), e.g. up to 10 vals of $(A_1)$ and/or $(A_2)$ and/or $(A_3)$ per val of (L), whereby non-reacted salt or non-reacted base (A) remains in solution and may, after separation of (P), be recuperated from the motherlye or be employed in a further production sequence. It is, however, preferred to keep the employed quantity of (A) as low as possible, as is sufficient for an exhaustive salt formation. The smallest quantity of (A) required for an exhaustive reaction of the thiol groups may be determined by means of a few preliminary tests, whereby there may occasionally have to be considered that some further substituents at (L), e.g. amino groups and/or hydroxy groups, may be capable of reacting with the employed cations so that a correspondingly higher need of (A) is to reckon in such cases. Depending on the employed (L) the preferred total quantity of (A) may vary; advantageously the val ratio (A)/(L) is in the range of 1:1 to 3:1.

As one val of (L) there is meant here one mole of (L) divided by the average number y of thiol groups in the molecule.

As one val of $(A_1)$ there is meant here one mole of $(A_1)$ divided by the valence of the metal cation.

As one val of $(A_2)$ there is meant here one mole of the polymer divided by the number of the reactive, optionally protonated and/or quaternized, basic amino groups [which equals here also the functionality of $(A_2)$], [e.g. for the dicyanodiamide reaction products of the kind of $(A_{21})$ there are in general presumed two reactive amino groups per molecule of dicyanodiamide in the reaction product of dicyanodiamide with diethylenetriamine]. Similarly for homopolymers there may be taken as one val of $(A_2)$ the molar weight of the monomer divided by the number of amino respectively ammonium groups in the monomer.

One val $(A_3)$ = one mole $(A_3)$ divided by the number of the total of the basic, protonated and quaternized amino groups in the molecule.

The reaction of (L) with (A) takes place preferably in aqueous medium, advantageously in the temperature range between room temperature (=20° C.) and boiling temperature of the reaction mixture, principally in the temperature range between 40° C. and boiling temperature, preferably between 75° C. and boiling temperature, in particular, e.g. in the temperature range from 75° to 95° C. if (A) is dissolved at least colloidally in water [e.g. for quaternized or protonated compounds of the kind of $(A_2)$ and $(A_3)$ or for hydrosoluble compounds $(A_1)$, e.g. soluble metal salts] or at temperatures in the range of 90° C. to the boil if (A) is dispersed in water [as e.g. for non-quaternized and non-protonated compounds of the kind $(A_2)$ or for compounds $(A_1)$ not readily soluble in water, in particular metal hydroxides or -oxides]. The pH of the reaction mixture may vary in a broad range, namely from distinctly basic to distinctly acidic pH-values, preferentially at strongly basic to nearly neutral pH-values, in particular in the pH range from 14 to 7.5, if there is employed e.g. a metal hydroxide or oxide or a preferably non-protonated compound of the kind $(A_2)$ or $(A_3)$, or at weakly basic to distinctly acidic pH-values, in particular in the pH range from 9 to 4, if there are employed e.g. salts (A), or strongly acidic pH-values, in particular in the range of pH 4.5 to 1, preferably 3.5 to 2, if there is employed a highly protonated product of the kind $(A_2)$ and/or a strong acid in addition to a salt (A) more particularly $(A_1)$. (Such strong acids are e.g. conventional mineral acids, in particular hydrochloric acid, sulphuric acid or phosphoric acid). The concentration of leuco sulphur dye (L) in the aqueous reaction medium may vary in a broad range, advantageously in the concentration range from 5 to 50% by weight, preferably in the range of from 10 to 40% by weight. By the choice of the reaction parameters (in particular concentration, val ratio, pH and temperature) there may be influenced the physico-chemical properties of the pigments. The required reaction-duration may vary depending on the employed starting materials, in particular in the range of from 20 minutes to 10 hours, mainly in the range of from 30 minutes to 5 hours. After completion of the reaction the pH-value may, if desired be modified; preferred pH-values are in the range between 3.5 and 9, in particular between 4.5 and 8, more preferably between 5 and 8. With particular advantage the production of the sulphur dye (preferably by thionation) its reduction to (L) and the desolubilization of (L) are carried in one operational sequence and without isolation of the intermediate products.

The produced desolubilized product may be isolated, in particular from the mother liquor, in a manner conventional per se, e.g. by filtration or centrifugation and may, if desired, be washed and dried.

The desolubilized products are standardized, in particular so as to bring them into a form as is suitable for their use as pigments. Standardization may take place in a manner known per se, conveniently in mechanical way, optionally with the aid of a solid or liquid carrier, principally by comminuting e.g. by grinding (e.g. in a comminuting mill or in an airjet mill) or by micronizing (e.g. by means of supersonic waves) advantageously to reach a particle size $\leq 50$ μm, in particular 0.1 to 20 μm, preferably 0.1 to 5 μm.

According to a particular feature of the invention the produced desolubilized products may be modified before or after their standardization by a further reaction. Thus, reaction products of (L) and (A) that contain reactive amino groups may be reacted with (B) mono- or polyfunctional aldehydes and/or
(C) methylol compounds.

As (B) come preferably into consideration formaldehyde or formaldehyde-yielding compounds (e.g. paraformaldehyde) or glyoxal.

As (C) come in general into consideration N-methylol compounds as conventionally known as crosslinkers in the finishing of cellulosic fibres and wherein the methylol groups may optionally by etherified with $C_{1-4}$-alkyl, in particular such as described above for $(x_3)$.

The reaction with (B) and/or (C) may take place for instance in aqueous medium in a pH-range of 2.5 to 9.5, preferably 6.0 to 8.5. For the reaction with (B) there are advantageously chosen nearly neutral to acidic pH-values, in particular pH 2.5 to 7.5, preferably 6 to 7, whereas the reaction with (C) is advantageously carried out in the presence of a catalyst (k) and the pH may vary, depending on the methylol compounds and the catalyst, preferably in the pH-range of 6 to 8.5. The reaction is advantageously carried out in aqueous medium, in particular without isolating the pigment resulting from the reaction of (L) with (A) from the aqueous reaction medium; the reaction temperature is advantageously in the temperature range of 40° C. to boiling temperature, preferably of 80° C. to boiling temperature. The reaction duration may vary broadly, depending on the reactants; it will, in general, be in the range of from 20 minutes to 10 hours, in particular 30 minutes to 5 hours.

The ratio of the quantity of (B) resp. (C) to the corresponding amino group-containing reaction product of (L) and (A) will suitably be chosen in dependance on the content of such reactive amino groups in the starting material [e.g. of formula (VII)], which may, for instance be determined titrimetrically. There may be reacted all or even only a part of the reactive amino groups, whereby this reaction is undertaken principally in order to improve the pigment properties of the product, in particular with respect to solubility, fastnesses and/or capability of being worked into the substrate. The chosen quantity and kind of (B) and/or (C) therefore depends also on the finally desired effect.

The reaction products of the corresponding amino group-containing reaction products of (L) with (A), in particular of formula (VII), with (B) and/or (C) may be represented by means of the following formula

  (IX)

wherein $L_2$ corresponds to the definition of $L_1$ or signifies a reaction product of an amino group-containing $L_1$ with (B) and/or (C) and A" corresponds to the definition of A' or signifies a reaction product of an amino group-containing A' with (B) and/or (C) and the compounds of formula (IX) may also be correspondingly polymerized and/or cross-linked over (B) and/or (C), at least one of $L_2$ and A" signifying the reaction product of $L_1$ respectively A' with (B) or (C).

The synthetized reaction products with (B) and/or (C) may be isolated and further treated in a manner conventional per se; they may in particular be separated from the motherlye and preferably washed and dried and then conveniently be standardized as indicated above to a particle size suitable for their use as pigments, e.g. by milling.

The milling may take place in dry form or also in the presence of a liquid carrier, e.g. in water or an organic medium, e.g. in one or more of the solvents mentioned below or/and in the presence of substrate components e.g. resin components, oils or solvents, as conventional for printing inks or pastes or in paints, and/or in plastic substrate to give e.g. a pigment-containing master batch.

For use the pigments (P) of the invention may advantageously be formulated to pigment-containing compositions, principally to pigment-containing master-batches or lacquer, ink or paste formulations, or may even be directly incorporated into plastic masses before their shaping, and a further object of the invention is represented by pigment-containing compositions comprising a pigment (P) as defined above.

By selection of the components, in particular of the A-cations, the properties of the respective pigments may be influenced or/and modified in a broad range.

The pigments (P) of the invention are practically insoluble in water. The reaction products of (L) with $(A_1)$, $(A_2)$ and $(A_{32})$ and their further reaction products with (B) and (C) are also practically insoluble in most of the conventional organic solvents and oils (e.g. as conventionally employed in oil- and/or solvent-containing printing ink formulations), as oils there being especially meant mineral oils and as organic solvents there being principally meant the following: methanol, ethanol, n-butanol, benzyl alcohol, acetone, ethylmethylketone, cyclohexanone, ethyleneglycol monomethylether or monoethylether, ethylacetate, n-butyl acetate, benzene, xylene, toluene, white spirit, carbon tetrachloride, perchloroethylene, diethyleneglycol monobutylether, ethoxypropanol, methoxypropanol, 1:1 mixture of ethoxypropanol and methoxypropanol and 1:1:1 mixture of water, diethyleneglycol monobutylether and methoxypropanol. The reaction products of (L) with $(A_{31})$ are partially soluble in organic solvents.

Pigments of high stability to bleaching oxidation and chlorine treatment may be selected from the reaction products of (L) with $(A_1)$ and/or $(A_2)$ and their further reaction with (B) and/or (C).

The reaction products of (L) with $(A_{32})$ distinguish in particular by their bleachability with hypochlorite, which renders the respective pigments particularly suitable for their use in the printing of paper, with a view to its recycling, in particular de-inking and hypochlorite-bleach.

When used in printing inks for the printing of paper (in particular newsprints) the printed paper may easily be de-inked by usual de-inking methods as are conventional in paper-recycling, and may also be subjected to a bleaching treatment, in particular by means of hypochlorite (mainly sodium or calcium hypochlorite) under conditions as conventional for the hypochlorite bleach in paper-recycling, by which, depending on the degree of hypochlorite-bleachability a correspondingly bleached recycled paper may be obtained.

The pigments (P) of the invention may be used in general in any field of technique in which pigments are employed, in particular for the dyeing respectively pigmenting of natural, modified or synthetic substrates in the mass, in particular in solvent-containing or essentially solvent-free plastics masses (e.g. for pigmenting polyethylene, polypropylene, polystyrene, polyvinylchloride, synthetic rubbers or rubber surrogates or synthetic leather), of modified natural substrates (e.g. for the dyeing of viscose or cellulose acetates in the spinning mass or for the pigmentation of modified caoutchouc), of natural substrates (e.g. caoutchouc), in synthetic resins (e.g. in paints on oily or aqueous basis or in lacquers of various kinds) or further in printing compositions for the graphic industry (printing pastes or printing inks), for pigment printing, for the coating of textile material or leather or for the dyeing of paper in the mass. The pigments (P) of the invention confer to the treated substrate a colour corresponding to the colour of (L) or a similar shade of notable fastnesses, in particular light-fastness (especially the black pigments), fastness to washing, fastness to perborate, fastness to rubbing, fastness to varnishing, fastness to overdyeing, fastness to solvents and stability to migration gration and heat-treatment. Particularly worth mention are the pigments of darker shades, principally black, dark red, brown, blue and dark green pigments, among which in particular the inventive derivatives of C. I. Sulphur Black 1 and 2 are worth mention, which are usable as substitutes for or additives to carbon black (in particular lamp black), e.g. for car tires, pneumatic tires and rubber soles, in printing inks, e.g. for the printing of newspapers and books, in base-coats (adhesive coats) and/or in pre-top coats (intermediate coats) for leather and synthetic leather, and in adhesive compositions for rubber profiles. In view of the hypochlorite-bleachability of the recycled paper pulp in resp. upon de-inking, they are particularly suitable for the formulation of printing inks. Such printing inks, which are characterized by a content of a pigment (P) as defined above, may contain printing ink formulation components as conventional per se for printing inks, in particular solvents, resins and/or oils, and optionally further components as suitable for the selected use, e.g. letterpress, lithograph, dry offset, flexograph or rotogravure printing inks, of which particularly the newsprint inks are to be emphasized. The (P)-content in the ink formulations may vary broadly, depending in particular on the ink formulation and use, principally in the range of 1 to 50%, in particular 2 to 30%, based on the weight of the ink. They may also be used as toners in conventional printing inks.

In the following examples parts and percentages are by weight and the temperatures are indicated in degrees Celsius.

EXAMPLE 1

1.1. 200 g of 2,4-dinitrochlorobenzene are reacted with 169 g of 50% sodium hydroxide at 100° C. during 2 hours. The so obtained product is reacted under aqueous reflux with 210 g of 60% sodium sulphide and 113 g of sulphur at 118° C. during 7 hours. There is obtained a mass of a black leuco sulphur dye (1.1) (corresponding to C. I. Leuco Sulphur Black 1) which is cooled to 60° C.

1.2. To this mass (1.1) are added at 60° C. 600 g of water and 75 g of Ca(OH)$_2$; the temperature rises thereby up to the boiling point and is maintained at the boil for 1 hour. After cooling to 60° C. the pH is adjusted to 6.0 by addition of 320 g of HCl of 30% concentration. There is obtained a black precipitate (1.2).

1.3. The precipitate (1.2) is filtered, washed, dried and milled (particle-size 2–10 μm). There are obtained 249 g of a black sulphur pigment (1.3) in the form of powder, which is insoluble in water and organic solvents (as listed above) and is slightly soluble in aqueous sodium sulphide.

EXAMPLE 2

An aqueous 20% suspension of the filtered black precipitate (1.2) obtained according to Example 1.2., is reacted at pH 6.5, during 2 hours, at the boil, with 75 g of 38% formaldehyde. The obtained product is filtered, washed, dried and milled; there are obtained 275 g of a black pigment (2) in the form of a dry powder (particle size 2–10 μm), which is insoluble in water, organic solvents (as listed above) and aqueous sodium sulphide.

EXAMPLE 3

The black leuco sulphur dye (1.1) obtained according to Example 1.1. is reacted in 700 g of water with 100 g of the product according to Example 3 of DE-AS 16 95 787, during 2 to 3 hours at 85°–90° C. The obtained reaction product is treated with sulphuric acid of 50% concentration until the pH has reached the value of 6.5, then the product is filtered, washed, dried and milled (particle-size 2–10 μm). There are obtained 240 g of a dry black pigment powder (3), which is insoluble in water and organic solvents (as listed above) and is readily bleachable with sodium hypochlorite.

EXAMPLE 3.1

The procedure described in Example 3 is repeated with the difference that in place of the product of Example 3 of DE-AS 16 95 787 there is employed the same amount of the product of Example 1 of DE-AS 16 95 787, giving a black dry pigment powder (3.1).

EXAMPLE 3.2

The procedure described in Example 3 is repeated with the difference that in place of the product of Example 3 of DE-AS 16 95 787 there is employed the same amount of the product of Example 5 of DE-AS 16 95 787, giving a black dry pigment powder (3.2).

EXAMPLE 4

600 g of water and 60 g of polycondensate according to Example 1 of DE 35 25 104 A1 are mixed with the black leuco sulphur dye (1.1) obtained according to Example 1.1. and the mixture is heated to 90° C. and maintained during 30 minutes at this temperature. Subsequently 80 g of Ca(OH)$_2$ are added and the mixture is maintained at the boiling temperature during 1 hour. The product is then acidulated with 380 g of HCl of 30% concentration to a pH of 6.5 and maintained at the boiling temperature at this pH during a further hour. The so-obtained product is filtered, washed, dried and milled (particle-size 2–10 μm). There are obtained 256 g of a black pigment powder (4) which is insoluble in water and organic solvents (as listed above) and displays very good fastnesses to perborate and to chlorine.

EXAMPLE 4.1

The procedure described in Example 4 is repeated with the difference that in place of the product of Example 1 of DE 35 25 104 A1 there is employed the same amount of the product according to Example 1 of DE 36 22 840 A1, giving a black dry pigment powder (4.1).

EXAMPLE 5

90 g of metaphenylenediamine are reacted with a mixture of 30 g of water and 37 g of 38% of formaldehyde. The obtained product is reacted under aqueous reflux with a mixture of 100 g of water, 150 g of diethyleneglycol monoethylether, 140 g of sodium sulphide and 175 g of sulphur at 150° C. during 40 hours. There is obtained a viscous mass of a reduced yellowish brown dye corresponding to C.I. Leuco Sulphur Brown 37. To this mass there are added 750 g of water and 60 g of 50% sodium hydroxide and the obtained mixture is stirred during 2 hours at 90° C., cooled to 60° C. and then aerated by passing air through the solution in order to oxidize the sulphide. When the sulphides have been oxidized there are added 140 g of water, 150 g of 50% sodium hydroxide and 140 g of glucose and the obtained mixture is stirred during 30 minutes at 75° C. Then it is cooled to 40° C. and the pH of the mixture is adjusted to 8.0 by addition of HCl of 30% concentration. To the obtained mixture there is added a quantity of iron chloride hydrate corresponding to 100 g of $FeCl_3$ and the final pH is adjusted to 4.5-5.0 by further addition of hydrochloric acid of 30% concentration. The mixture is heated for 1 to 2 hours at 85° C. and then filtered, washed, dried and milled. There are obtained 225 g of a brown sulphur pigment (5). Particle size 2-10 μm.

APPLICATION EXAMPLE A

A cotton fabric is cylinder-printed with a printing paste obtained by admixing 1 part of the pigment (4) obtained according to Example 4 and 6 parts of "Printofix PD liquid" (a thickening agent on the basis of a copolymer of acrylic acid ester and vinyl acetate) and then dried at 120° C. for 5 minutes and steamed at 180° C. for 6 minutes. There is obtained a deep black print of outstanding fastnesses to washing, rubbing, light and chlorine.

Analogously as the pigment (4) the pigment (4.1) is employed in Application Example A.

APPLICATION EXAMPLE B

Paper for newspapers is offset-printed with a printing ink obtained by admixing 1 part of the black pigment (3) obtained in Example 3 and 3 parts of "RO-ZET 8014" (a binder for offset-rollers, by Gebr. SCHMIDT, Druckfarbenfabrik, Frankfurt a/M, Germany) and then dried at ambient temperature. There is obtained a print which is comparable in colour-depth and fastnesses to light and rubbing with conventional newspaper prints, but which, contrary to conventional newspaper-prints, is readily bleachable with sodium hypochlorite.

Analogously as the pigment (3) any of the pigments (3.1), (3.2), (4), (4.1) and (1.3) is employed in Application Example B.

APPLICATION EXAMPLE C 0.5 Parts of the pigment (1.3) obtained according to Example 1.3. and 5 parts of titanium dioxide are intimately mixed with 100 parts of moulding material consisting of
63 parts of a polyvinyl chloride emulsion
32 parts of dioctyl phthalate
3 parts of a commercial epoxide plasticizer
1.5 parts of a commercial stabilizer (barium/cadmium complex)
0.5 parts of a commercial chelator.

For improved pigment distribution, the mixture is worked for 8 minutes on a roller mill set at 160° C., with one roller rotating at 20 r.p.m. and the other at 25 r.p.m. to exert friction. Subsequently it is extruded as film of 0.3 mm thickness. The film is uniformly pigmented in black with a notable fastness to light and stability to heat and to migration.

APPLICATION EXAMPLE D

Application Example C is repeated with the difference that the 5 parts of titanium dioxide are replaced by 5 parts of the same pigment (1.3). A very deep black pigmentation of the film is obtained.

Analogously as the pigment (1.3) the pigment (2) or (5) is employed in Application Example D.

APPLICATION EXAMPLE E

70 Parts of a commercial polyethylene with 30% of low molecular components and 30 parts of the pigment (4) obtained according to Example 4 are worked in an extruder to a master batch. This master batch is then admixed in a weight ratio of 1:50 with a commercial polypropylene and spun in conventional way to black pigmented fibres.

APPLICATION EXAMPLE F

To 1.5 parts of the pigment (3) obtained according to Example 3 there are admixed 22.5 parts of a ground vehicle consisting of a mixture of 30% of phenolic resin and 70% of xylene. The obtained mixture is ground in a 2-arms planet flapping grinder to obtain a fluid ink suitable for rotogravure-printing.

Analogously as the pigment (3) any of the pigments (3.1), (3.2), (1.3) and (4) is employed in Application Example F.

APPLICATION EXAMPLE G

5 Parts of the pigment (4) obtained according to Example 4 are dispersed in
95 parts of stove enamel vehicle consisting of
50 parts of a 60% solution of coco aldehyde melamine resin of 32% fat content, in xylene,
30 parts of a 50% melamine resin solution in butanol,
10 parts of xylene and
10 parts of ethylene glycol monoethylether
and the mixture is ground for 24 hours in a ball mill. The dispersion obtained is sprayed on an aluminum sheet, the spray coating is allowed to dry in the air for 30 minutes and then stoved for 30 minutes at 120° C. There is obtained a black pigmented enamel.

Analogously as the pigment (4) the pigment (1.3) is employed in Application Example G.

APPLICATION EXAMPLE H

A black printing ink is produced by mixing
12% of pigment (3)
85% of mineral oil (1 Pa.s) and
3% of mineral oil of low viscosity
It is suitable as letterpress newprint ink.

We claim:

1. A pigment (P) obtainable by cationizing desolubilization of
    (L) the coloured leuco form of a sulphur dye
    and standardization of the desolubilized product.

2. A pigment (P) according to claim 1, wherein desolubilization is carried out by reaction of (L) with at least one cationizing compound (A) selected from
    ($A_1$) a polyvalent metal base or a polyvalent metal salt,
    ($A_2$) an optionally protonated and/or quaternized polyamine, and
    ($A_3$) a tertiary of quaternary fatty amine, containing at least one fatty radical with at least 10 carbon atoms.

3. A process for the treatment of a substrate with a pigment which comprises treating a natural, modified or synthetic substrate with a pigment (P) according to claim 1.

4. A process according to claim 3 which comprises pigmenting or dyeing a modified natural substrate or a synthetic substrate with a pigment (P) in the mass or from a (P)—containing aqueous and/or organic solvent-based liquor or printing a substrate with a (P)—containing printing paste or ink or painting a substrate with (P)—containing paint.

5. A composition containing a pigment (P) according to claim 1 and being selected from polyethylene, polypropylene, polystyrene, polyvinylchloride, synthetic rubber, synthetic leather, viscose, cellulose acetate, modified caoutchouc, natural caoutchouc, oil-based and water-based resins, lacquers, printing pastes, printing inks, coatings for textile materials or leather, and paper.

6. A composition which is a plastic master batch or a printing ink and which contains a pigment according to claim 1.

7. A composition according to claim 6 which is a printing ink.

8. A printing ink according to claim 7 which is a newsprint ink.

9. A newsprint ink according to claim 8 wherein (L) is the colored leuco form of C.I. Sulfur Black 1 or 2.

10. A printing ink according to claim 7 wherein (L) is the colored leuco form of C.I. Sulfur Black 1 or 2.

11. A pigment (P) obtainable by reacting (L) the colored leuco form of a sulfur dye with at least one cationizing compound (A), which is suitable for introducing at least one desolubilizing cation, to produce a desolubilized reaction product containing a reactive primary or secondary amino group and either standardizing said desolubilized reaction product and then reacting the standardized product with (B) a mono- or polyfunctional aldehyde and/or (C) a methylol compound or further reacting said desolubilized reaction product with (B) and/or (C) and then standardizing the product of the further reaction.

12. A pigment according to claim 11 wherein standardizing is carried out by comminuting to a particle size $\leq 50$ μm.

13. A process for the treatment of a substrate with a pigment which comprises treating a natural, modified or synthetic substrate with a pigment (P) according to claim 11.

14. A composition containing a pigment (P) according to claim 11 and being selected from polyethylene, polypropylene, polystyrene, polyvinylchloride, synthetic rubber, synthetic leather, viscose, cellulose acetate, modified caoutchouc, natural caoutchouc, oil-based and water-based resins, lacquers, printing pastes, printing inks, coatings for textile materials or leather, and paper.

15. A process for producing a pigment (P) which comprises reacting a colored leuco sulfur (L) with at least one cationizing compound (A) which is suitable for the introduction of at least one desolubilizing cation to effect cationizing desolubilization of (L) and standardizing the desolubilized product.

16. A process according to claim 15 wherein the desolubilizing cation is selected from polyvalent metal cations and substituted ammonium cations and combinations thereof.

17. A process according to claim 15 wherein the cationizing compound (A) is selected from ($A_1$) a polyvalent metal base or a polyvalent metal salt, ($A_2$) an optionally protonated and/or quaternized polyamine, ($A_3$) a tertiary or quaternized amine containing at least one fatty radical with at least 10 carbon atoms and combinations of two or more of ($A_1$), ($A_2$), and ($A_3$).

18. A process according to claim 17 wherein standardizing is carried out by comminuting to a particle size $\leq 50$ μm.

19. A process according to claim 18 wherein (L) is selected from the group consisting of C.I. Leuco Sulfur Blacks 1, 2, 11 and 18, C.I. Leuco Sulfur Reds 10 and 14, C.I. Leuco Sulfur Blues 3, 7, 11, 13, 15 and 20, C.I. Reduced Vat Blue 43, C.I. Leuco Sulfur Greens 2, 16, 35 and 36, C.I. Leuco Sulfur Browns 1, 3, 10, 21, 26, 31, 37, 52, 95 and 96, C.I. Leuco Orange 1 and C.I. Leuco Sulfur Yellows 9 and 22.

20. A process according to claim 19 wherein the leuco sulfur dye (L) is at least partially in sodium thiolate form.

21. A product obtainable by the process of claim 19.

22. A process according to claim 17 which comprises reacting (L) with ($A_1$) and with ($A_2$) and/or ($A_3$).

23. A process according to claim 17 wherein ($A_1$) is ($A_{11}$) an oxide, hydroxide or salt of a polyvalent light metal.

24. A process according to claim 17 wherein
($A_1$) is
   ($A_{11}$) an oxide, hydroxide or salt of a polyvalent light metal or
   ($A_{12}$) a polyvalent transition metal oxide, hydroxide or salt,
($A_2$) is selected from
   ($A_{21}$) reaction products of
      ($x_1$) cyanamide, dicyanodiamide, guanidine or biguanide with
      ($x_2$) at least one primary or secondary mono-or polyfunctional aliphatic mono- or polyamine;
   ($A_{22}$) mixtures or pre-reacted products of ($A_{21}$) with
      ($x_3$) at least one N-methylol compound of ureas, melamine, guanamines, triazinones, urones, urethanes, carbamates or acid amides, optionally in the presence of a catalyst (k);
   ($A_{23}$) precondensates of ($A_{21}$) with
      ($x_4$) epihalohydrin or dihalohydrin;
   ($A_{24}$) reaction products of ammonia or ($x_2$) with ($x_4$);
   ($A_{25}$) reaction products of ($A_{24}$) with
      ($x_5$) 1,3-diaminopropanol-2;
   ($A_{26}$) homopolymers of
      ($x_6$) a mono- or di(meth)allylamine or co- or terpolymers of
      ($x_7$) one or more mono- and/or di(meth)allylamine and optionally tri(meth)allylamine;
   ($A_{27}$) polymers, containing as repeating units at least two quaternary ammonium groups linked by aliphatic and/or aromatic hydrocarbon bridges which may optionally be interrupted by ether-oxygen and/or ester, amide and/or imide groups;
   and mixtures of at least 2 of the polymers ($A_{21}$) to ($A_{27}$), and
($A_3$) is selected form
   ($A_{31}$) fatty amines of formulae III and IV

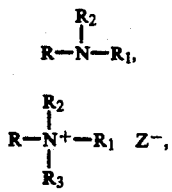

(III)

(IV)

wherein
R signifies an aliphatic hydrocarbon radical with 10–24 carbon atoms,
$R_1$ signifies $C_{1-4}$-alkyl
$R_2$ signifies $C_{1-24}$-alkyl, $C_{3-24}$-alkenyl or benzyl
$R_3$ signifies $C_{1-4}$-alkyl and
$Z^-$ signifies the equivalent of an anion
and protonated acid addition products of amines of formula III, and
($A_{32}$) methylolated melamine derivatives containing at least one $C_{10-24}$-fatty radical and at least one quaternary ammonium group.

25. A pigment (P) obtainable by the process of claim 24.

26. A process according to claim 24 wherein
($A_{11}$) is MgO, $MgCl_2$, $Ca(OH)_2$, $AlCl_3$ or $TiOCl_2$
($A_{12}$) is copper-II oxide or chloride, manganese dichloride, nickel oxide, iron sulfate or iron trichloride and
($A_{32}$) is a compound of the general average of formula V

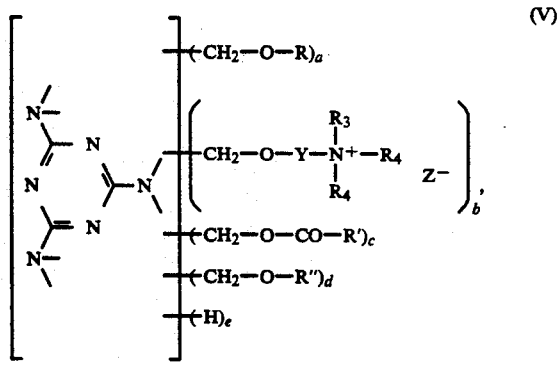

in which
R' signifies an aliphatic hydrocarbon radical with 1–23 carbon atoms,
R" signifies hydrogen or $C_{1-4}$-alkyl,
$R_4$ signifies $C_{1-4}$-alkyl or $C_{2-4}$-hydroxyalkyl,
Y signifies $C_{2-4}$-alkylene or di(hydroxymethyl)-ethylene,
$Z^-$ signifies the equivalent of an anion,
a is a number from 0.5 to 2.5,
b is a number from 1 to 1.2,
c is a number from 0 to 2.5,
d is a number from 1 to 4.5
e is 6−(a+b+c+d) and
a+b+c+d=3 to 6.

27. A process according to claim 26 wherein (L) is C.I. Leuco Sulfur Black 1 or C.I. Leuco Sulfur Black 2.

28. A process according to claim 24 wherein (L) is selected from the group consisting of C.I. Leuco Sulfur Blacks 1, 2, 11 and 18, C.I. Leuco Sulfur Reds 10 and 14, C.I. Leuco Sulfur Blues 3, 7, 11, 13, 15 and 20, C.I. Reduced Vat Blue 43, C.I. Leuco Sulfur Greens 2, 16, 35 and 36, C.I. Leuco Sulfur Browns 1, 3, 10, 21, 26, 31, 37, 52, 95 and 96, C.I. Leuco Orange 1 and Leuco Sulfur Yellows 9 and 22.

29. A process according to claim 28 wherein standardizing is carried out by comminuting to a particle size $\leq 50$ μm.

30. A process according to claim 29 wherein (L) is C.I. Leuco Sulfur Black 1 or C.I. Leuco Sulfur Black 2.

31. A pigment (P) obtainable by the process of claim 30.

32. A printing ink comprising a pigment (P) according to claim 31.

33. A pigment (P) obtainable by the process of claim 29.

34. A process for the treatment of a substrate with a pigment which comprises treating a natural, modified or synthetic substrate with a pigment according to claim 33.

35. A process according to claim 15 which comprises the further steps of producing the colored leuco sulfur dye (L) by carrying out a thionation reaction to produce a sulfur dye and reducing the sulfur dye to the leuco form (L), the reaction steps of thionation, reduction and desolubilization being carried out in one operational sequence without isolation of the intermediate products.

36. A process for producing a pigment (P) which comprises reacting a colored leuco sulfur dye (L) with at least one cationizing compound (A) which is suitable for the introduction of at least one desolubilizing cation to produce a desolubilized reaction product containing a reactive primary or secondary amino group and either standardizing said desolubilized reaction product and then reacting the standardized product with (B) a mono- or polyfunctional aldehyde and/or (C) a methylol compound or further reacting said desolubilized reaction product with (B) and/or (C) and then standardizing the product of the further reaction.

37. A process according to claim 36 wherein (B) is formaldehyde, a formaldehyde-yielding compound or glyoxal and (C) is an N-methylol compound in which the methylol groups may be etherified with $C_{1-4}$alkyl and which is selected from N-methylol derivatives of urea, cyclic ureas, urone, and ($C_{1-12}$alkyl)-hexahydro-1,3,5-triazine-2-one; methylolated lactames of $C_{4-6}$-aminocarboxylic acids, N,N-dimethylol(meth)acrylamide, N-methylol(meth)acrylamide, β, N-dimethylol(-meth)acrylamide, N-methylol cyclic carbamates with 2 to 4 carbon atoms in the alkylene ring element, $C_{1-4}$-alkylene-N,N,N',N'-tetramethyloldicarbamates, $C_{1-4}$-alkyl-N, N'-dimethylolcarbamates wherein the alkyl radical is substituted with hydroxy or $C_{1-2}$alkoxy, and N-methylol derivatives of amino-substituted triazines.

38. A pigment (P) obtainable by the process of claim 37.

* * * * *